US010269371B2

(12) United States Patent
Kay et al.

(10) Patent No.: US 10,269,371 B2
(45) Date of Patent: Apr. 23, 2019

(54) TECHNIQUES FOR DECREASING ECHO AND TRANSMISSION PERIODS FOR AUDIO COMMUNICATION SESSIONS

(71) Applicant: Google LLC, Mountain View, CA (US)

(72) Inventors: Erik Kay, Emerald Hills, CA (US);
Jonas Erik Lindberg, Stockholm (SE);
Serge Lachapelle, Vallentuna (SE);
Henrik Lundin, Sollentuna (SE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/720,498

(22) Filed: Sep. 29, 2017

(65) Prior Publication Data

US 2018/0061437 A1    Mar. 1, 2018

Related U.S. Application Data

(63) Continuation of application No. 15/246,950, filed on Aug. 25, 2016, now Pat. No. 9,779,755.

(51) Int. Cl.
*G10L 21/00* (2013.01)
*G10L 21/043* (2013.01)
(Continued)

(52) U.S. Cl.
CPC ........ *G10L 21/043* (2013.01); *G10L 21/0208* (2013.01); *H04L 65/1069* (2013.01);
(Continued)

(58) Field of Classification Search
CPC combination set(s) only.
See application file for complete search history.

(56) References Cited

U.S. PATENT DOCUMENTS 6,243,672 B1    6/2001  Iijima et al.
7,016,850 B1    3/2006  Cox et al.
(Continued)

FOREIGN PATENT DOCUMENTS

EP      1750397 A1      2/2007
WO   2007091206 A1      8/2007
(Continued)

OTHER PUBLICATIONS

PCT International Search Report and Written Opinion dated Oct. 19, 2017 for PCT International Application No. PCT/US2017/048584, 12 pages.
(Continued)

*Primary Examiner* — Vu B Hang
(74) *Attorney, Agent, or Firm* — IP Spring

(57) ABSTRACT

A computer-implemented technique can include establishing an audio communication session between first and second computing devices and obtaining, by the first computing device, an audio input signal using audio data captured by a microphone. The first computing device can analyze the audio input signal to detect a speech input by its first user and can determine a duration of a detection period from when the audio input signal was obtained until the analyzing has completed. The first computing device can then transmit, to the second computing device, (i) a portion of the audio input signal beginning at a start of the speech input and (ii) the detection period duration, wherein receipt of the portion of the audio input signal and the detection period duration causes the second computing device to accelerate playback of the portion of the audio input signal to compensate for the detection period duration.

20 Claims, 2 Drawing Sheets

(51) Int. Cl.
*G10L 21/0208* (2013.01)
*H04L 29/06* (2006.01)
*G10L 15/20* (2006.01)
*G10L 25/78* (2013.01)
*G10L 19/005* (2013.01)
*G10L 21/0232* (2013.01)

(52) U.S. Cl.
CPC .............. *H04L 65/80* (2013.01); *G10L 15/20* (2013.01); *G10L 19/005* (2013.01); *G10L 21/0232* (2013.01); *G10L 25/78* (2013.01)

(56) References Cited

U.S. PATENT DOCUMENTS

| | | |
|---|---|---|
| 7,099,820 B1 | 8/2006 | Huart et al. |
| 2005/0058145 A1 | 3/2005 | Florencio et al. |
| 2007/0061147 A1* | 3/2007 | Monne ................. G10L 15/30 704/270.1 |
| 2008/0281586 A1 | 11/2008 | Florencio et al. |
| 2014/0369528 A1* | 12/2014 | Ellner .................. H04M 3/568 381/119 |

FOREIGN PATENT DOCUMENTS

| | | |
|---|---|---|
| WO | 2013026203 A1 | 2/2013 |
| WO | 2018039547 | 3/2018 |

OTHER PUBLICATIONS

PCT International Search Report and Written Opinion dated Sep. 27, 2017 for PCT International Application No. PCT/US2017/047090, 11 pages.

USPTO, Notice of Allowance for U.S. Appl. No. 15/246,950, dated Jun. 6, 2017, 8 Pages.

\* cited by examiner

TECHNIQUES FOR DECREASING ECHO AND TRANSMISSION PERIODS FOR AUDIO COMMUNICATION SESSIONS

CROSS-REFERENCE TO RELATED APPLICATIONS

This application is a continuation of U.S. patent application Ser. No. 15/246,950, filed Aug. 25, 2016. The entire disclosure of the above application is incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio communication sessions, such as voice over Internet protocol (VoIP) sessions, can involve two or more users providing audio inputs to their computing devices and the devices exchanging encoded audio packets indicative of the audio inputs via a network. Upon receipt, the audio packets are decoded to obtain an audio signal, which can be output by the receiving computing device via a speaker. In some cases, the playback of received audio can be captured by a microphone of the listening computing device, such as during a period when the listening user is not actively speaking. This captured playback can then be transmitted and output at the other computing device, which is also known as echo.

SUMMARY

A computer-implemented method, a first computing device, and a computer-readable medium are presented. The first computing device can include one or more processors and a non-transitory memory storing a set of instructions that, when executed by the one or more processors, causes the first computing device to perform operations. The computer-readable medium can also have the set of instructions stored thereon that, when executed by the one or more processors of the first computing device, causes the first computing device to perform the operations.

The method and the operations can include obtaining, by the first computing device, an audio input signal for an audio communication session with a second computing device using audio data captured by a microphone of the first computing device; analyzing, by the first computing device, the audio input signal to detect a speech input by a first user associated with the first computing device; determining, by the first computing device, a duration of a detection period from when the audio input signal was obtained until the analyzing has completed; transmitting, from the first computing device and to the second computing device, (i) a portion of the audio input signal beginning at a start of the speech input and (ii) the detection period duration, wherein receipt of the portion of the audio input signal and the detection period duration causes the second computing device to accelerate playback of the portion of the audio input signal to compensate for the detection period duration; analyzing, by the first computing device, the audio input signal to detect an end of the speech input by the first user; and terminating transmission, from the first computing device to the second computing device, of the portion of the audio input signal at a point corresponding to the detected end of the speech input by the first user.

In some embodiments, the method and the operations can further include encoding, by the first computing device, the portion of the audio input signal to obtain a set of audio packets, wherein the transmitting includes transmitting, to the second computing device, (i) the set of audio packets and (ii) the detection period duration.

In some embodiments, receipt of the set of audio packets and the detection period duration causes the second computing device to: decode the set of audio packets to obtain an audio output signal; remove a redundant portion of the audio output signal corresponding to one or more pitch periods to obtain the modified audio output signal, wherein the modified output signal has a shorter length than the audio output signal; and output, by a speaker of the second computing device, the modified audio output signal. In some embodiments, a quantity of the one or more removed pitch periods corresponds to the detection period duration. In some embodiments, receipt of the set of audio packets and the detection period duration causes the second computing device to remove the redundant portion of the audio output signal by: cross-correlating the audio output signal with itself to obtain an autocorrelation signal; and detecting one or more peaks of the autocorrelation signal that exceed a threshold indicative of the one or more pitch periods of the audio output signal.

In some embodiments, analyzing the audio input signal to detect the speech input includes applying a voice activity detection (VAD) technique to the audio input signal, the VAD technique having an aggressiveness or accuracy that corresponds to the detection period duration. In some embodiments, applying the voice detection technique to the audio input signal includes distinguishing the speech input by the first user from speech by the second user within the audio input signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
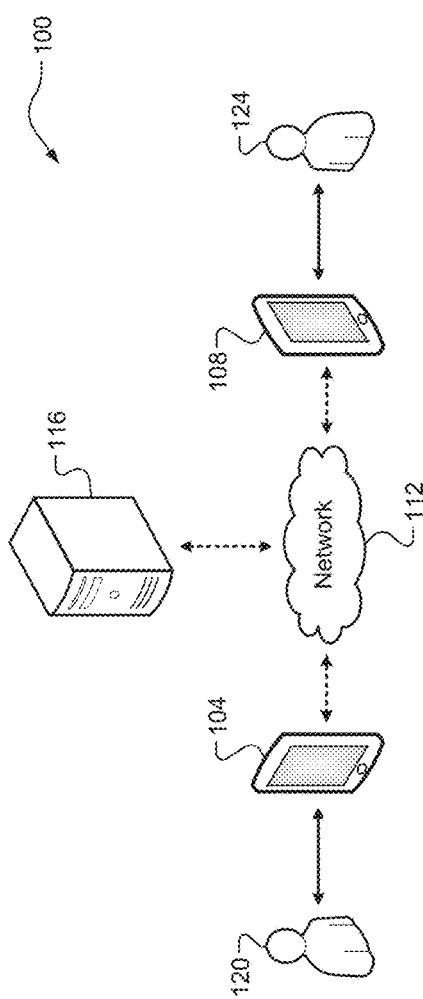
FIG. 1 is a diagram of a computing system including an example computing device according to some implementations of the present disclosure.

During audio communication sessions, such as voice over Internet protocol (VoIP) sessions, audio packets are received and decoded to obtain an audio signal, which is output by the receiving computing device via a speaker. In some cases, the playback of received audio can be captured by a microphone of the computing device, such as during a period when the listening user is not actively speaking. This captured audio playback can then be transmitted to and output by the other computing device, which is also known as echo. To minimize echo, echo suppression or echo cancellation techniques can be used. Echo cancellation, for example, can involve identifying the output audio signal that is output by the speaker and then detecting and removing the output audio signal from the input audio signal captured by the microphone. These techniques, however, do not work in certain environments, e.g., noisy areas. As a result, users may have to manually mute the microphones of their computing devices while they are not talking. Other techniques aim to detect local speech and only transmit audio when the user is actively speaking, but this can result in clipping of the user's speech and/or the audio becoming out-of-sync with corresponding video, e.g., for a video chat session.

Accordingly, improved techniques are presented for decreasing echo and transmission periods for audio communication sessions. The techniques begin by detecting when a user is speaking (e.g., using a voice activity detection, or VAD technique). For accuracy purposes, there may be a slight lag (e.g., one hundred milliseconds or more) associated with the VAD technique. This analysis of this audio input can also involve distinguishing between the local user's speech and filtering out or ignoring speech by the other user (e.g., captured echo). Once speech is detected, the computing device can begin transmission. This transmission can include a portion of the speech input back to the point when speech was initially detected. The other computing device can receive the transmitted audio, but there will be a synchronization gap, e.g., due to the VAD technique.

The transmitting computing device, therefore, can also calculate and transmit information indicative of a duration of the delay period. This can be used by the receiving device to rapidly regain sync without clipping any of the audio. Instead of speeding up the audio playback, which is done by conventional techniques and can undesirably affect the pitch, the receiving computing device can detect and remove a redundant portion of the audio output signal corresponding to one or more pitch periods before playback. Removing one or more pitch periods results in faster playback, because the length of the audio signal is shortened, but without any undesirable pitch modification.

One technical problem being solved is echo prevention. As mentioned above, this echo can occur due to audio playback being captured by the listening computing device and transmitted back to the originating computing device. The technical advantages of these techniques include not requiring the user to actively control the microphone/speakers to avoid echo. Another technical problem being solved is audio synchronization after a delay without affecting the audio pitch. As mentioned above, conventional techniques accelerate audio playback, which affects the pitch and is undesirable to the listening user. The technical advantages of these techniques, therefore, include fast audio playback synchronization after a delay without affecting the audio pitch.

Referring now to FIG. 1, a diagram of an example computing network 100 is illustrated. The computing network 100 can include a first computing device 104 that can communicate with a second computing device 108 via a network 112. While mobile phone configurations of the computing devices 104, 108 are illustrated, it will be appreciated that the first and second computing devices 104, 108 can be any suitable computing devices configured for communication via the network 112 (desktop computers, laptop computers, tablet computers, etc.). The network 112 can be a cellular network (2G, 3G, 4G long term evolution (LTE), etc.), a computing network (local area network, the Internet, etc.), or some combination thereof. A server computing device 116 can also communicate via the network 112. For example, the server computing device 116 could coordinate the audio communication session (e.g., a voice over Internet protocol (VoIP) session) between the first and second computing devices 104, 108.

This audio communication session could be established, for example, in response to inputs from users 120, 124 at one or both of the first and second computing devices 104, 108. For example, the second user 124 may provide an input at the second computing device 108 to call the first user 120 (an audio communication session request), which could then be accepted by the first user 120 via another input at the first computing device 104, thereby establishing the audio communication session. During the audio communication session, audio packets corresponding to audio inputs (e.g., from users 120, 124) can be exchanged via the server computing device 116 between the first and second computing devices 104, 108. While the first computing device 104 is described as receiving audio data packets from the second computing device 108, it will be appreciated that the first computing device 104 can also transmit audio packets to the second computing device 108.

The term "audio communication session" as used herein can refer to either an audio-only communication session or an audio/video communication session. Further, while the techniques herein are described as being implemented at one of the first and second computing devices 104, 108 that is receiving the audio packets (the receiving device), it will be appreciated that at least a portion of these techniques could be implemented at the server computing device 116. More particularly, when the server computing device 116 is coordinating the audio communication session, the audio packets can flow through the server computing device 116. For example, the server computing device 116 could have a queue of audio packets and could perform at least a portion of these techniques, such as decoding, compressing, and then re-encoding for transmission to the receiving device, which could then merely decode and playback upon receipt.

Figure 2:
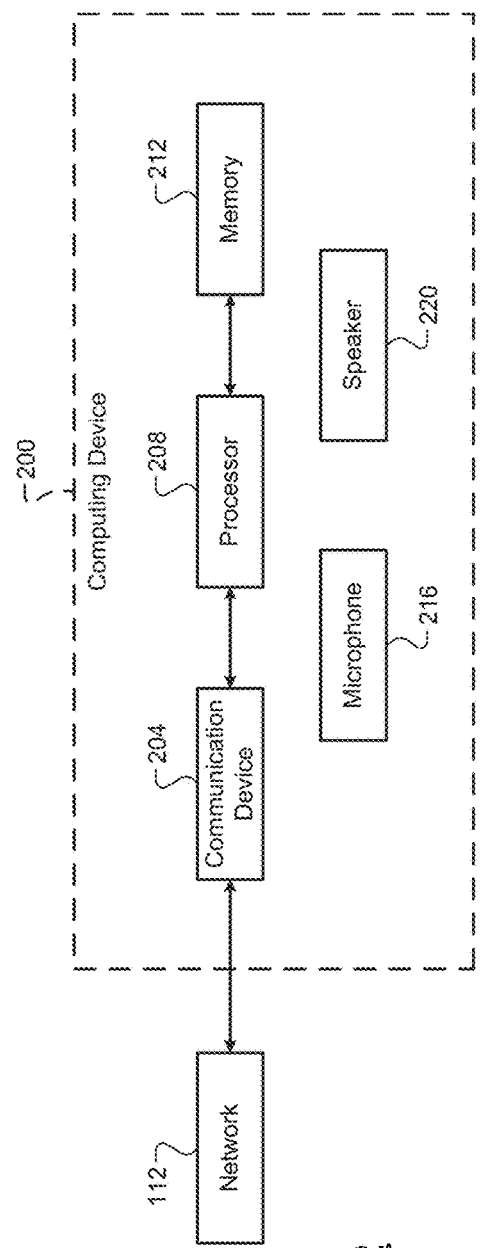
FIG. 2 is a functional block diagram of the example computing device of FIG. 1.

Referring now to FIG. 2, a functional block diagram of an example computing device 200 is illustrated. The computing device 200 can represent the configurations of the first and second computing devices 104, 108. It will be appreciated that the server computing device 116 could also have the same or similar configuration as the computing device 200. The computing device 200 can include a communication device 204 (e.g., a wireless transceiver) configured for communication via the network 112. A processor 208 can be configured to control operation of the computing device 200. The term "processor" as used herein can refer to both a single processor and two or more processors operating in a parallel or distributed architecture. A memory 212 can be any suitable storage medium (flash, hard disk, etc.) configured to store information at the computing device 200. In one implementation, the memory 212 can store instructions executable by the processor 208 to cause the computing device 200 to perform at least a portion of the disclosed techniques.

The computing device 200 can also include a microphone 216 configured to capture audio input and a speaker 220 configured to generate audio output. The microphone 216 can be any suitable acoustic-to electric transducer or sensor that converts sound into an electrical signal. This can include speech (e.g., by users 120, 124) as well as other noise, such as background noise. The captured audio data (e.g., an analog signal) is then digitized and converted to an audio input signal (e.g., a digital signal). This audio input signal can be encoded into audio packets for transmission via the network 112. Received audio packets can be decoded into an audio output signal. The audio output signal can be provided to the speaker 220, which in turn can produce audible sound corresponding to the audio output signal. The speaker 220 can include a set of electroacoustic transducers that convert an electrical signal into a corresponding sound. While not shown, it will be appreciated that the computing device 200 can include other suitable components, such as a display (a touch display), physical buttons, a camera, and the like.

Once the audio communication session is established between the first and second computing devices 104, 108, audio information can be exchanged. The first computing device 104 can capture audio information using its microphone 216 to obtain an audio input signal. The first computing device 104 can then analyze the audio input signal to detect a speech input by the first user 120, such as by applying speech detection (e.g., a VAD technique) on the audio input signal. To achieve a desired accuracy, the VAD technique may have a slight delay associated therewith (e.g., a few hundred milliseconds). This delay period, also referred to herein as a detection period, can be described as having a duration that corresponds to an aggressiveness or accuracy of the VAD technique. In other words, this period represents a delay from when the audio input signal is obtained to a point where the speech input is detected.

Once the speech input is detected in the audio input signal, the first computing device 104 can identify a portion of the audio input signal beginning at the point of the detected speech. The first computing device 104 can then encode audio data packets corresponding to this identified portion of the audio input signal. The first computing device 104 can transmit these encoded audio data packets to the second computing device 108, along with information indicative of the detection period duration. This information relating to the detection period duration could also be included in encoded data packets. No audio information, however, is transmitted prior to these encoded audio data packets. By transmitting only the portion of the audio input signal beginning with the speech input, echo can be decreased or eliminated without using an echo canceler or suppresser.

The first computing device 104 can also analyze the audio input signal to determine an end of the speech input by the first user 120. Once the end of this speech input has been detected, the first computing device 104 can terminate transmission of the portion of the audio input signal to the second computing device 108. The transmission termination point can be a particular point in the audio input signal that corresponds to the detected end of the speech input. The first computing device 104 can then continue analyzing the audio input signal to detect a next occurrence of a speech input by the first user 120, after which transmission to the second computing device 108 can resume according to the techniques herein.

The second computing device 108 can receive the encoded audio packets and can decode the encoded audio packets to obtain an audio output signal. The second computing device 108 can also receive the information indicative of the detection period duration and can process it accordingly to obtain the detection period duration. The second computing device 108 can then accelerate playback of the audio output signal to compensate for the determined detection period. This acceleration of the audio playback can include compressing (e.g., removing a redundant portion of) the audio output signal and then outputting the modified audio output signal. In some implementations, a quantity of the one or more removed pitch periods corresponds to the detection period duration. After the pitch period(s) are removed, the second computing device 108 has a modified audio output signal having a shorter duration than the original audio output signal, which results in accelerated playback.

In some implementations, the second computing device 108 can utilize signal correlation to identify one or more pitch periods for removal. More particularly, the second computing device 108 can cross-correlate the audio output signal with itself to obtain an autocorrelation signal. Autocorrelation, cross-autocorrelation, and serial correlation all refer to the process of cross-correlating a signal with itself at different temporal points. The autocorrelation signal represents a similarity of samples as a function of a time gap between them and it can be used for identifying the presence of a periodic signal obscured by noise. Specifically, the second computing device 108 can identify a peak in the autocorrelation signal, which represents a strong periodicity in the audio output signal. This identification can be performed using a threshold. For example only, a threshold of approximately 0.5 can be used. In contrast, a straightforward accelerated playback technique might use a threshold of approximately 0.9. It will be appreciated that any suitable threshold may be used, but lower thresholds will generally provide for increased speed.

Specifically, the lower threshold of approximately 0.5 increases speed (e.g., up to ~15%) while making little if any difference on the quality of the modified audio output signal. The location of this peak can also represent a pitch period of the audio input signal (i.e., a pitch period of the speech). The second computing device 108 can then remove at least one of the pitch periods from the audio output signal to obtain a modified audio output signal. In some implementations, multiple pitch periods could be removed, but the length of the multiple pitch periods could be limited to a certain size (e.g., less than 7.5 milliseconds) to avoid potential buffering problems. Various combinations of the above could also be implemented: lower correlation threshold only, removal of multiple pitch periods, or both. The results can include up to 25% increased speed compared to straightforward playback acceleration techniques, while not having a negative effect on audio output pitch. The effective accelerate rate is increased to between 50% and 90%, depending on the audio input signal, which translated to reducing buffer delay by 500 ms to 900 ms.

Figure 3:
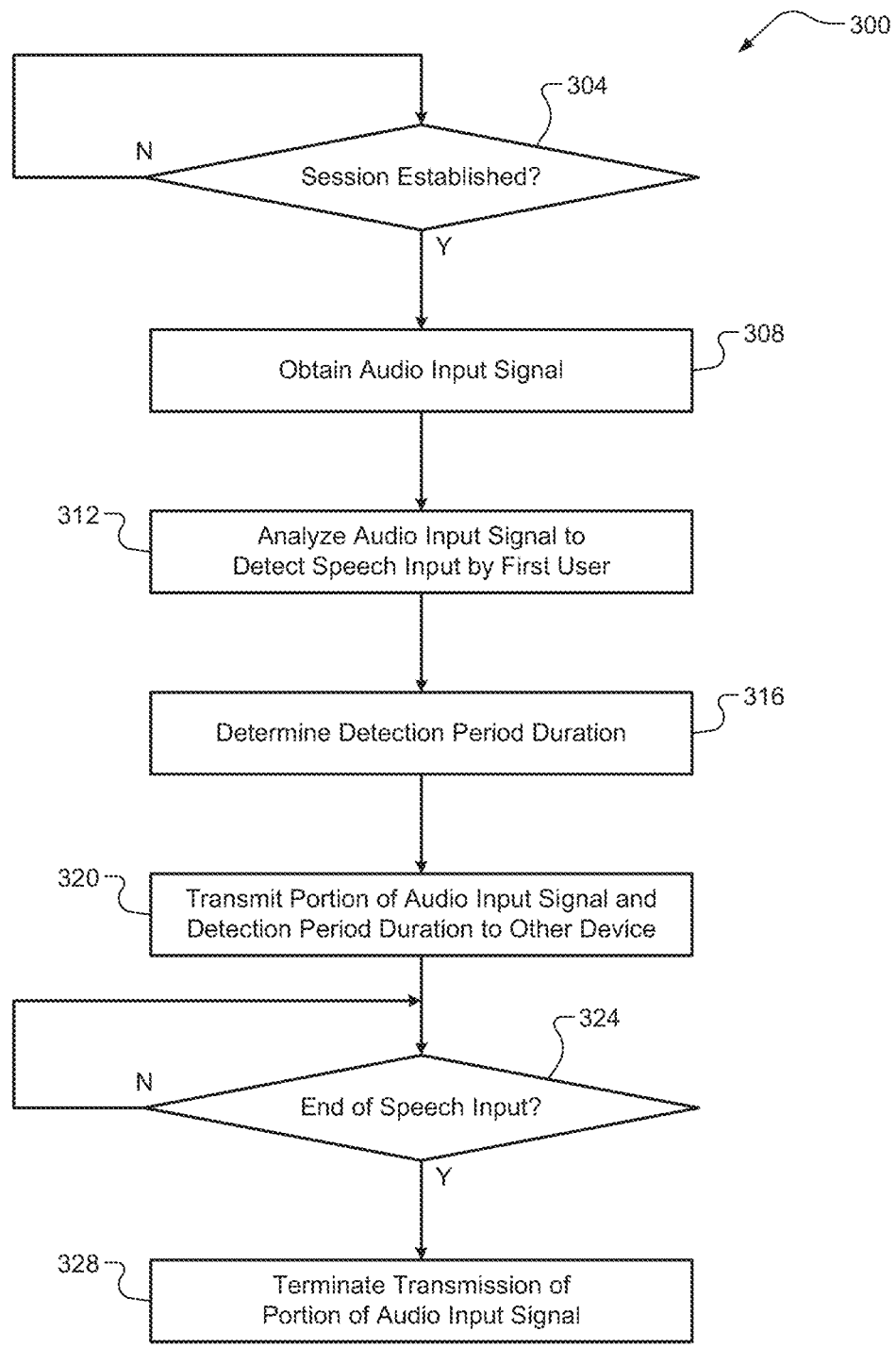
FIG. 3 is a flow diagram of an example technique for decreasing echo and transmission periods for audio communication sessions according to some implementations of the present disclosure.

Referring now to FIG. 3, a flow diagram of an example technique 300 for decreasing echo and transmission periods for audio communication sessions is shown. At 304, an audio communication session (VoIP, video chat, etc.) can be established (e.g., by the server computing device 116) between the first computing device 104 and the second computing device 108. At 308, the first computing device 104 can obtain an audio input signal for the audio communication session based on audio data captured by its microphone 216. At 312, the first computing device 104 can analyze the audio input signal to detect a speech input by the first user 120. At 316, the first computing device 104 can determine a duration of a detection period from when the audio input signal is obtained to when the analyzing has completed. At 320, the first computing device 104 can transmit, to the second computing device 108, the portion of the audio input signal (e.g., encoded audio packets) and the detection period duration.

At 324, the first computing device 104 can analyze the audio input signal to detect an end of the speech input by the first user 120. If the end is not detected, the technique 300 can return to 324. If the end is detected, however, the technique 300 can proceed to 328 where the first computing device 104 can terminate transmission of the portion of the audio input signal at an appropriate point. The technique 300 can then end or return to 304. As previously discussed herein, receipt of the portion of the audio input signal and the detection period duration causes the second computing device 108 to accelerate playback of the portion of the audio input signal to compensate for the detection period duration, e.g., by removing a redundant portion of the audio output signal corresponding to one or more pitch periods to obtain a modified audio output signal for output by its speaker 220.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method to reduce echo, comprising:
    receiving a detected portion of an audio input signal for an audio communication session between a first computing device and a second computing device, wherein the detected portion of the audio input signal was captured by a microphone of the first computing device and the detected portion of the audio input signal includes a pitch period;
    identifying the pitch period for removal by cross-correlating the audio input signal with itself;
    obtaining a modified portion of the audio input signal by removing the pitch period; and
    outputting the modified portion of the audio input signal, wherein the modified portion of the audio input signal is output for playback on a speaker.

2. The computer-implemented method of claim 1, wherein identifying the pitch period for removal by cross-correlating the audio input signal with itself includes identifying a peak in an autocorrelation signal based on application of a threshold.

3. The computer-implemented method of claim 1, wherein the modified portion of the audio input signal has a shorter length than the detected portion of the audio input signal.

4. The computer-implemented method of claim 2, wherein the threshold is between 0.5 and 0.9.

5. The computer-implemented method of claim 1, further comprising transmitting the modified portion of the audio input signal to the second computing device.

6. The computer-implemented method of claim 1, wherein the detected portion of the audio input signal was determined by applying a voice activity detection (VAD) technique to the audio input signal, and wherein a duration of the detection period is a delay associated with the VAD technique.

7. The computer-implemented method of claim 6, wherein the VAD technique distinguishes speech by a first user from noise and speech by another user.

8. A computing system having one or more processors and a non-transitory memory storing a set of instructions that, when executed by the one or more processors, causes the computing system to perform operations comprising:
    receiving a detected portion of an audio input signal for an audio communication session between a first computing device and a second computing device, wherein the detected portion of the audio input signal was captured by a microphone of the first computing device and the detected portion of the audio input signal includes a pitch period;
    identifying a pitch period for removal from a detected portion of the audio input signal by cross-correlating the audio input signal with itself at one or more temporal points;
    obtaining a modified portion of the audio input signal by removing the pitch period; and
    outputting the modified portion of the audio input signal, wherein the modified portion of the audio input signal is output for playback on a speaker.

9. The computing system of claim 8, wherein identifying the pitch period for removal identifying a peak in an autocorrelation signal based on application of a threshold.

10. The computing system of claim 8, wherein the modified portion of the audio input signal has a shorter length than the detected portion of the audio input signal.

11. The computing system of claim 9, wherein the threshold is between 0.5 and 0.9.

12. The computing system of claim 8, wherein the audio input signal is part of a video communication session.

13. The computing system of claim 8, wherein the detected portion of the audio input signal was determined by applying a voice activity detection (VAD) technique to the audio input signal, and wherein a duration of the detection period is a delay associated with the VAD technique.

14. The computer-implemented method of claim 13, wherein the VAD technique distinguishes speech by a first user from noise and speech by another user.

15. A non-transitory computer-readable medium having a set of instructions stored thereon that, when executed by the one or more processors of a computing system, causes the computing system to perform operations comprising:

receiving a detected portion of an audio input signal for an audio communication session between a first computing device and a second computing device, wherein the detected portion of the audio input signal was captured by a microphone of the first computing device and the detected portion of the audio input signal includes a pitch period;

identifying the pitch period for removal by cross-correlating the audio input signal with itself;

obtaining a modified portion of the audio input signal by removing the pitch period; and outputting the modified portion of the audio input signal, wherein the modified portion of the audio input signal is output for playback on a speaker.

16. The computer-readable medium of claim 15, wherein identifying the pitch period for removal by cross-correlating the audio input signal with itself includes identifying a peak in an autocorrelation signal based on application of a threshold.

17. The computer-readable medium of claim 15, wherein the modified portion of the audio input signal has a shorter length than the detected portion of the audio input signal.

18. The computer-readable medium of claim 16, wherein the threshold is between 0.5 and 0.9.

19. The computer-readable medium of claim 15, wherein the operations further comprise transmitting the modified portion of the audio input signal to the second computing device.

20. The computer-readable medium of claim 15, wherein the detected portion of the audio input signal was determined by applying a voice activity detection (VAD) technique to the audio input signal, wherein the VAD technique distinguishes speech by a first user from noise and speech by another user, and wherein a duration of the detection period is a delay associated with the VAD technique.

\* \* \* \* \*